United States Patent [19]

Collins et al.

[11] Patent Number: 4,758,608

[45] Date of Patent: Jul. 19, 1988

[54] UV CURABLE NON-CRYSTALLINE ACETAL TERPOLYMERS

[75] Inventors: George L. Collins, Maplewood; Paul Zema, Roselle Park; William M. Pleban, Stanhope, all of N.J.

[73] Assignee: Hoechst Celanese Corporation, Somerville, N.J.

[21] Appl. No.: 96,188

[22] Filed: Sep. 14, 1987

[51] Int. Cl.[4] ............................................. C08L 59/04
[52] U.S. Cl. ..................................... 522/43; 522/100; 522/103; 522/142; 522/166; 525/398; 525/401; 525/410; 528/230; 528/246; 528/250; 528/270
[58] Field of Search ................. 522/43, 100, 103, 166, 522/142; 525/398, 401, 410; 528/230, 246, 250, 270

[56] References Cited

U.S. PATENT DOCUMENTS

| | | | |
|---|---|---|---|
| 3,215,671 | 11/1965 | Melby | 522/43 |
| 3,519,696 | 7/1970 | Cherdron et al. | 525/414 |
| 3,533,930 | 10/1970 | Lawton et al. | 522/142 |
| 3,795,715 | 3/1974 | Cherdron et al. | 525/398 |
| 4,409,370 | 10/1983 | Froix et al. | 525/414 |

FOREIGN PATENT DOCUMENTS 4222065 10/1967 Japan .

Primary Examiner—Lucille M. Phynes
Attorney, Agent, or Firm—Lyon & Lyon

[57] ABSTRACT

Ultraviolet curable terpolymers of trioxane, from at least 65 weight percent to about 75 weight percent of 1,3-dioxolane and from about 2 weight percent to about 20 weight percent of a monoethylenically unsaturated aliphatic diol formal having at least 4 carbon atoms in its main chain, e.g., 4,7-dehydro-1,3-dioxepin, which are non-crystalline at room temperature or above are disclosed. These terpolymers, when admixed with a multifunctional crosslinking monomer, e.g., a multifunctional acrylate such as 1,6-hexanediol diacrylate, and a photosensitizer, e.g., a benzoin compound such as benzoin isobutyl ether, can be cured to an insoluble, non-tacky, rubbery state using UV radiation. The thus-cured polymeric materials form useful crosslinked films, and when cryogenically ground to a suitable small particle size can be blended with conventionally prepared crystalline oxymethylene homo-, co- and terpolymers to improve the latters' impact properties.

37 Claims, No Drawings

UV CURABLE NON-CRYSTALLINE ACETAL TERPOLYMERS

BACKGROUND OF THE INVENTION

1. Field of the Invention

This invention relates to novel acetal terpolymers. More particularly, this invention relates to novel ultraviolet (UV) curable terpolymers of trioxane, 1,3-dioxolane and certain formals of monoethylenically unsaturated aliphatic diols. These terpolymers are non-crystalline at room temperature (about 25° C.) or above by virtue of having higher dioxolane contents than copolymers or terpolymers hitherto contemplated by the prior art, although they can be made to crystallize at temperatures below room temperature. They can be admixed with multifunctional acrylates or similarly - performing multifunctional crosslinking monomers and a photosensitizer or UV initiator and cured to an insoluble, non-tacky, rubbery state using UV radiation. The resulting cured polymeric materials form useful crosslinked films, and can also be cryogenically ground to a suitable small particle size and then blended with conventionally prepared crystalline oxymethylene homo-, co- and terpolymers to improve the impact properties of molded articles made therefrom.

2. Description of the Prior Art

Commonly-assigned copending U.S. patent application Ser. No. 07/096,187, filed of even date herewith in the names of George L. Collins, Paul Zema and William Pleban and entitled "Low Tg Non-Crystalline Acetal Copolymers", discloses and claims low Tg (glass transition temperature) trioxane/ 1,3-dioxolane copolymers which are also non-crystalline at room temperature or above (although they too can be made to crystallize at temperatures below room temperature) and which have a dioxane content greater than 65 mol percent and less than about 75 mol percent and an IV (intrinsic viscosity) of from about 1.00 to about 2.3, as measured by standard viscometric measurements, e.g., in o-chlorophenol. These copolymers contain no unsaturated sites for subsequent crosslinking, and are not disclosed as being curable by reaction with multifunctional crosslinking monomers under UV curing conditions.

Trioxane/1,3-dioxolane/unsaturated diol formal terpolymers are disclosed in U.S. Pat. No. 3,297,647, issued January 10, 1967 to Schott et al. The unsaturated diol formals disclosed in the Schott et al patent include 2-butene-1,4-diol formal, 2-hexane-1,4-diol formal and 2-(2-ethyl)butene-1,4-diol formal (column 2, lines 11-14), the amounts of monomers disclosed are as follows:

"(t)he cyclic ether or saturated cyclic formal is advantageously used in an amount of 0.1 to 59.9% by weight, calculated on the total monomer mixture. The formal of the unsaturated diol is advantageously used in an amount of 59.9 to 0.2% by weight, calculated on the total monomer mixture. The trioxane is advantageously used in an amount of 40 to 99.8% by weight, calculated on the total monomer mixture", column 2, lines 17-24, and the patentees had this to say about the interrelationships between monomer contents and polymer properties:

"The physical properties of the terpolymers can be varied within wide limits and depend, on the one hand, on the nature and concentration of the saturated cyclic formal or saturated cyclic ether and, on the other hand, on the concentration of the formal of an unsaturated cyclic diol.

For example, when 0.1 to 10% by weight, calculated on the total monomer mixture, of unsaturated cyclic formal and 0.1 to 10% by weight, calculated on the total monomer mixture, of saturated cyclic formal or ether are used highly crystalline products are obtained, whereas with 40 to 59.9% by weight, calculated on the total monomer mixture of unsaturated cyclic formal or ether, amorphous elastic glass-clear products are obtained. The more voluminous the second comonomer, the lower is the crystallinity and the higher is the elasticity. The decrease in crystallinity can be well measured by means of X-rays.

Low molecular weight terpolymers which constitute waxes or oils can easily be obtained with the use of high concentrations of catalyst, that is about 0.1 to 1% by weight, calculated on the total monomer mixture.

The above statements are intended to indicate the wide limits within which the properties of the terpolymers obtained by the process of the invention may be varied, the incorporation of different comonomers having, of course, different effects on the properties of the terpolymers and the transitions being fluid", column 2, lines 25-52.

The Schott et al patent does not disclose terpolymers having 1,3-dioxolane contents in excess of 59.9% by weight, based on the total weight of monomers present, or blends of its terpolymers with crystalline oxymethylene polymers. And while Schott et al do disclose that their olefinic unsaturation-containing terpolymers can be crosslinked:

"(v)ery interesting properties are imparted to the terpolymers of the invention by the double bonds contained in the main chain, which double bonds enable the terpolymers to be crosslinked by known methods. For example, the terpolymers may be vulcanized by kneading with sulfur", column 2, lines 53-58, there is neither a disclosure of crosslinking with multifunctional crosslinking monomers nor a disclosure of UV curing.

U.S. Pat. No. 3,215,671, issued Nov. 2, 1965 to Melby, discloses crosslinking oxymethylene homopolymers using, in one embodiment, from 0.5 to 20% by weight of a polyunsaturated compound (multifunctional acrylates are disclosed) and a photoinitiator under UV light. See, e.g., column 2, lines 21-25 and 63-72. The crosslinked product is characterized as having an extent of crosslinking:

"... such that at least 30% of the polymer composition remains undissolved when a film thereof of 5-8 mils thickness is immersed in one hundred times its weight of boiling dimethylformamide for two minutes", column 2, lines 30-39, or such that:

"... at least one covalently bonded linkage [is present] between catenarian carbon atoms of different polyoxymethylene chains for each for polyoxymethylene polymer molecules", column 2, lines 40–44. Melby's crosslinked oxymethylene homopolymers appear to be crystalline materials; see from column 5, line 67 to column 8, line 10. In no case are they characterized as noncrystalline.

SUMMARY OF THE INVENTION

Terpolymers of trioxane, 1,3-dioxolane and from about 2 to about 20 weight percent, and preferably from about 5 to about 10 weight percent, of a formal of a monoethylenically unsaturated aliphatic diol having at least 4 carbon atoms in its main chain, i.e., the chain containing the ethylenic unsaturation and bearing the diol's hydroxy groups, such as 4,7-dehydro-1,3-dioxepin (2-butene-1,4-diol formal) and the like, which are non-crystalline at room temperature (about 25° C.) or above have now been prepared and found to have useful properties neither present in prior art materials nor contemplated by the prior art. These terpolymers are non-crystalline at room temperature or above by virtue of having higher dioxolane contents than copolymers or terpolymers hitherto contemplated by the prior art, i.e., dioxolane contents greater than 65 weight percent and less than about 75 weight percent, e.g. about 70 weight percent, and have intrinsic viscosities (IV) of from about 0.5 to about 1.5, and preferably from about 0.8 to about 1.0, as measured by standard viscometry methods, e.g., in o-chlorophenol. When admixed with multifunctional acrylates or similarly-performing multifunctional crosslinking monomers and a photosensitzer or UV initiator and cured to an insoluble, non-tacky, rubbery state using UV radiation, they can form useful crosslinked films or be cryogenically ground to a suitable small particle size for blending with conventionally prepared crystalline oxymethylene homo-, co- and terpolymers to improve the impact properties of the crystalline polymer in articles molded from such blends.

It is therefore an object of the invention to provide novel acetal terpolymers.

It is also an object of this invention to provide novel UV curable terpolymers of trioxane, 1,3-dixolane and a formal of a monoethylenically unsaturated aliphatic diol having at least 4 carbon atoms in its main chain, such terpolymers being non-crystalline at room temperature or above and having higher dioxolane contents than hitherto contemplated in the prior art.

A further object of this invention is to provide UV curable blends comprising such non-crystalline trioxane/1,3-dioxolane/monoethylenically unsaturated aliphatic diol formal terpolymers with multifunctional acrylates or similarly-performing multifunctional crosslinking monomers.

Another object of this invention is to provide articles prepared from such non-crystalline trioxane/1,3-dioxolane/monoethylenically unsaturated aliphatic diol formal terpolymer/multifunctional acrylate or similarly-performing multifunctional crosslinking monomer blends.

A still further object of this invention is to provide blends or admixtures of UV cured non-crystalline trioxane/1,3-dioxolane/monoethylenically unsaturated aliphatic diol formal terpolymer/multifunctional acrylate or similarly-performing multifunctional crosslinking monomer blends with crystalline oxymethylene homo-, co- and terpolymers, and articles prepared from such blends or admixtures which have improved impact properties.

These and other objects, as well as the nature, scope and utilization of this invention, will become readily apparent to those skilled in the art from the following description and the appended claims.

DETAILED DESCRIPTION OF THE INVENTION

The Novel UV Curable Non-Crystalline Acetal Terpolymer

The novel UV curable non-crystalline trioxane/1,3-dioxolane/monoethylenically unsaturated aliphatic diol formal terpolymers of this invention are preferably prepared by bulk polymerizing from about 2 weight percent to about 20 weight percent, and preferably from about 5 weight percent to about 10 weight percent, of the monoethylenically unsaturated aliphatic diol formal dissolved in a solution of trioxane and from at least 65 weight percent to about 75 weight percent, e.g., about 70 weight percent, of 1,3-dioxolane, these weight percentages being based, in each case, on the total weight of the three monomers used.

The polymerization reaction will be carried out under an inert atmosphere, e.g., one obtained using dry nitrogen, argon, or the like, or a mixture of inert gases, in the presence of a catalytically effective amount of a cationic polymerization catalyst, such as p-nitrobenzenediazoniumfluoroborate, trifluoromethanesulfonic acid, boron trifluoride, a boron trifluoride etherate, or the like, e.g., an amount ranging from about $5 \times 10^{-5}$ M/1 to about $2 \times 10^{-2}$ M/1, and preferably from about $1 \times 10^{-3}$ M/1 to about $5 \times 10^{-3}$ M/1, based on the volume of the reaction medium (reactants plus any solvents or suspending agents employed).

The conditions under which the polymerization reaction is carried out are not critical. This reaction will usually be carried out at room temperature and atmospheric for from about 20 to about 30 hours.

These polymers can also be prepared under the foregoing conditions by polymerizing the monoethylenically unsaturated aliphatic diol formal, trioxane and 1,3-dioxolane in a solvent, or suspending agent for the monomers, e.g., a halogenated hydrocarbon such as methylene chloride, a hydrocarbon such as hexane, cyclohexane, nonane or dodecane, an ether, or the like, or a mixture of two or more of these or other suitable solvents or suspending agents.

As indicated above, the monoethylenically unsaturated aliphatic diol formal termonomer will be one having at least 4 carbon atoms in its main chain. Preferably, formals of monoethylenically unsaturated aliphatic diols having from 4 to 8 carbon atoms in their main chains, which may be unsubstituted or substituted with, for example, one or more aliphatic hydrocarbon side chains containing from 1 to about 4 carbon atoms, will be used. Included among such monoethylenically unsaturated aliphatic diol formal termonomers are 4,7-dehydro-1,3-dioxepin (2-butene-1,4-diol formal), 3-pentene-1,4-diol formal, 2-n-hexene- 1,4-diol formal, 2-(2-ethyl)-butene-1,4-diol formal, 3-octene-1,4-diol formal, and the like.

UV Curable Blends of Non-Crystalline Acetal Terpolymers and Crosslinking Monomers UV curable blends of the novel non-crystalline trioxane/1,3-dioxolane/monoethylenically unsaturated aliphatic diol formal terpolymers of this invention will contain from about 1 to about 20 weight percent, and preferably from about 5 to about 10 weight percent, of the terpolymer admixed with a multifunctional crosslinking monomer, said weight percentages being based on the total weight of terpolymer and crosslinking monomer used.

Multifunctional acrylates, methacrylates, itaconates and like acid esters of polyols are preferred as the crosslinking monomers. Included among such compounds generally are monomers and prepolymers, i.e., dimers, trimers or other oligomers, or mixtures or copolymers thereof, of acrylic acid, methacrylic acid, itaconic acid and like acid esters of aliphatic polyols such as the di- and higher polyacrylates, di- and higher polymethacrylates and di- and higher polyitaconates of ethylene glycol, triethylene glycol, tetraethylene glycol, tetramethylene glycol, trimethylolethlane, butanediol, pentaerythritol, dipentaerythritol, tripentaerythritol, other polypentaerythritols, sorbitol, d-mannitol, diols of unsaturated fatty acids, and the like.

Specific examples of such multifunctional acrylates, methacrylates and itaconates include trimethylolpropane triacrylate, trimethylolethane triacrylate, trimethylolpropane trimethacrylate, trimethylolethane trimethacrylate, tetramethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol triitaconate, dipentaerythritol pentaitaconate, dipentaerythritol hexaitaconate, ethylene glycol dimethacrylate, 1,3-butanediol diacrylate, 1,3-butanediol dimethacrylate, 1,4-butanediol diitaconate, sorbitol triacrylate, sorbitol tetraacrylate, sorbitol tetramethacrylate, sorbitol pentaacrylate, sorbitol hexacrylate, dipropylene glycol dimethacrylate, polyethylene glycol dimethacrylate, polypropylene glycol diacrylate, substituted alkylene glycol diacrylates, dimethacrylates and diitaconates, e.g., halogen-substituted propylene glycol dimethacrylates, bisphenol A alkylene oxide adduct diacrylates, dimethacrylates and diitaconates such as bisphenol A/ethylene oxide adduct dimethacrylates, hydrogenated bisphenol A/alkylene oxide adduct diacrylates, dimethacrylates and diitaconates such as hydrogenated bisphenol A/propylene oxide adduct diiacrylates, urethane-modified polyacrylates, polymethacrylates and polyitaconates having two or more acryloyloxy, methacryloyloxy or itaconoyloxy groups in the molecule, prepared by reacting a diisocyanate with a compound containing two or more alcoholic hydroxyl groups and then reacting the resulting terminal isocyanate group-containing compound with an alcoholic hydroxy group-containing acrylate, methacrylate or itaconate; epoxy polyacrylates, polymethacrylates and polyitaconates having two or more acryloyloxy, methacryloyloxy or itaconoyloxy groups in the molecule, prepared by reacting a polyepoxide compound containing two or more epoxy groups with acrylic, methacrylate or itaconic acid, and the like, as well as mixtures thereof.

The UV curable blend will also contain from about 0.05 to about 20 weight percent, and preferably from about 0.5 to about 10 weight percent, based on the total weight of non-crystalline trioxane/1,3-dioxolane/-monoethylenically unsaturated aliphatic diol formal terpolymer and multifunctional crosslinking monomer used, of a photosensitizer or UV initiator.

The photosensitizer used can be any of the compounds conventionally employed to promote UV curing of unsaturated polymeric materials, including, for example, ketals such as benzyldimethyl ketal; benzoins such as benzoin and alkyl and aryl ethers of benzoin, e.g., benzoin methyl ether, benzoin ethyl ether, benzoin isopropyl ether and benzoin isobutyl ether; -methylbenzoin; anthraquinones such as 9,10-anthraquinone, 1-chloroanthraquinone, 2-chloroanthraquinone, 2-ethylanthraquinone; acetophenones such as acetophenone, 2-, 3- or 4-bromoacetophenone, 2,2-di-ethoxyacetophenone and 3- or 4-allyl acetophenone; benzophenones such as benzophenone, p-chlorobenzophenone, and 2-, 3- or 4-methoxybenzophenone; fluorenone; propiophenones such as 2-hydroxy-2-methylpropiophenone, 1-(4-isopropylphenyl)-2-hydroxy-2-methylpropiophenone; suberones such as dibenzosuberone, sulfur-containing compounds such as diphenyl disulfide, tetramethylthiuram disulfide, xanthone and thioxanthone; pigments such as methylene blue, eosine, fluoresceine; or the like, as well as mixtures thereof.

UV cure can be effected using any of a variety of known ultraviolet light sources: sun lamps, chemical lamps, low pressure and high pressure mercury vapor lamps, carbon arc lamps, xenon lamps, metal halide lamps, or the like, and will generally be carried out, using a source of 20 to 200 mW/cm$^2$, for from about 1 second to 15 minutes.

UV Cured Non-Crystalline Acetal Terpolymer Blends With Crystalline Oxymethylene Homo-, Co- and Terpolymers Crystalline oxymethylene polymers useful in preparing the blends of this invention are well known in the art. Such polymers are characterized in general as having recurring oxymethylene groups or units. The term oxymethylene polymer as used herein is intended to include any oxymethylene polymer having oxymethylene groups which comprise at least about 50 percent, and generally at least about 85 percent, of the polymer's recurring units, i.e., homopolymers, copolymers, terpolymers and the like.

Typically, oxymethylene homopolymers, or polyformaldehydes or [poly(oxymethylenes)], are prepared by polymerizing anhydrous formaldehyde or trioxane, a cyclic trimer of formaldehyde. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin et al.

Oxymethylene homopolymers are usually stabilized against thermal degradation by end-capping with, for example, ester or ether groups such as those derived from alkanoic anhydrides, e.g., acetic anhydride, or from dialkyl ethers, e.g., dimethyl ether, or by incorporating stabilizer compounds into the homopolymer, as described in U.S. Pat. No. 3,133,896 to Dolce et al.

Oxymethylene copolymers which are especially suitable for use in the blends of this invention will usually possess a relatively high level of polymer crystallinity, i.e., about 70 to 80 percent or higher. These preferred oxymethylene copolymers have repeating units which consist essentially of oxymethylene groups interspersed with oxy(higher)alkylene groups represented by the general formula:

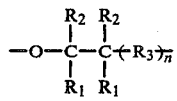

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

Oxymethylene groups generally will constitute from about 85 to about 99.9 percent of the recurring units in such copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Copolymers of the desired structure may be prepared by polymerizing trioxane together with from about 0.1 to about 15 mol percent of cyclic ether or cyclic formal having at least two adjacent carbon atoms, preferably in the presence of a catalyst such as a Lewis acid (e.g., $BF_3$, $PF_5$, and the like) or other acids (e.g., $HClO_4$, 1% $H_2SO_4$, and the like), ion pair catalysts, etc.

In general, the cyclic ethers and cyclic formals employed in making these preferred oxymethylene copolymers are those represented by the general formula:

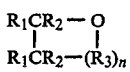

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred oxymethylene copolymers are ethylene oxide and 1,3-dioxolane, respectively. Among the other cyclic ethers and cyclic formals that may be employed are 1,3-dioxane, trimethylene oxide, 1,2-propylene oxide, 1,2-butylene oxide, 1,3-butylene oxide, 1,4-butanediol formal, and the like.

Oxymethylene copolymers produced from the preferred cyclic ethers have a structure composed substantially of oxymethylene and oxy(lower)alkylene, preferably oxymethylene, groups, and are thermoplastic materials having a melting point of at least 150° C. They normally are millable or processable at temperatures ranging from 180° C. to about 200° C., and have a number average molecular weight of at least 10,000 and an inherent viscosity of at least 1.0 (measured at 60° C. in a 0.1 weight percent solution in p-chlorophenol containing 2 weight percent of α-pinene).

These oxymethylene copolymers preferably are stabilized to a substantial degree prior to incorporating them into the blends of this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The oxymethylene copolymer may also be stabilized by end-capping, again using techniques well known to those skilled in the art. End-capping is preferably accomplished by acetylation with acetic anhydride in the presence of sodium acetate catalyst.

A particularly preferred class of oxymethylene copolymers is commercially available from Hoechst-Celanese Corporation under the designation CELCON ® acetal copolymer, and especially preferred is CELCON ® M25 acetal copolymer, which has a melt index of about 2.5g/10 min. when tested in accordance with ASTM D1238-82.

Oxymethylene terpolymers having oxymethylene groups, oxy(higher) alkylene groups such as those corresponding to the above-recited general formula:

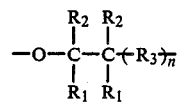

and a different, third group interpolymerizable with oxymethylene and oxy(higher)alkylene groups may be prepared, for example, by reacting trioxane, a cyclic ether or cyclic acetal and, as the third monomer, a bifunctional compound such as a diglycide of the formula:

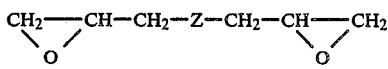

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive or an oxypoly(lower alkoxy) group, preferably one having from 2 to 4 recurring lower alkoxy groups each with 1 or 2 carbon atoms, for example, ethylene diglycide, diglycidyl ether and diethers of 2 mols of gylcide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol; 1,4-butanediol; 1,3-butanediol; cyclobutane-1,3-diol; 1,2-propanediol; cyclohexane-1,4-diol and 2,2,4,4-tetramethylcyclobutane-1,3-diol, with butanediol diglycidyl ethers being most preferred.

Generally, when preparing such terpolymers, ratios of from 99.89 to 89.0 weight percent trioxane, 0.1 to 10 weight percent of the cyclic ether or cyclic acetal and 0.01 to 1 weight percent of the bifunctional compound are preferred, these percentages being based on the total weight of monomers used in forming the terpolymer. Ratios of from 99.85 to 89.5 weight percent of trioxane, 0.1 to 10 weight percent of cyclic ether or cyclic acetal and 0.05 to 0.5 weight percent of diglycidyl ether are particularly preferred, these percentages again being based on the total weight of monomers used in forming the terpolymer.

Terpolymer polymerization may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about −50° C. to about +100° C.

Cationic polymerization catalysts, such as organic or inorganic acids, acid halides and, preferably, Lewis acids, can be used in preparing the terpolymers. Of the latter, boron fluoride and its complex compounds, for example, etherates of boron fluoride, are advantageously used. Diazonium fluoroborates are particularly advantageous.

Catalyst concentration may be varied within wide limits, depending on the nature of the catalyst and the intended molecular weight of the terpolymer. Thus, catalyst concentration may range from about 0.0001 to about 1 weight percent, and preferably will range from about 0.001 to about 0.1 weight percent, based on the total weight of the monomer mixture.

Since catalysts tend to decompose the terpolymer, the catalyst is advantageously neutralized immediately after polymerization using, for example, ammonia or methanolic or acetonic amine solutions.

Unstable terminal hemiacetal groups may be removed from the terpolymers in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissolved in an alkaline medium at temperatures above 100° C. and subsequently reprecipitated. Suitable alkaline media include benzyl alcohol, ethylene glycol monoethyl ether, or a mixture of 60 weight percent methanol and 40 weight percent water containing ammonia or an aliphatic amine.

The terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° for a specified period of time, and then washed with water and dried or centrifuged.

A preferred oxymethylene terpolymer is commercially available from Hoechst-Celanese Corporation under the designation CELCON® U10 acetal polymer, and is a butanediol diglycidyl ether/ethylene oxide/trioxane terpolymer containing about 0.05 weight percent, 2.0 weight percent, and 97.95 weight percent of repeating units derived from these termonomers, respectively, based on the total weight of these termonomers.

Crystalline oxymethylene polymers admixed with plasticizers, formaldehyde scavengers, mold lubricants, antioxidants, fillers, colorants, reinforcing agents, light stabilizers and other stabilizers, pigments, and the like, can be used in the blends of this invention so long as such additives do not materially affect such blends' desired properties, particularly enhancement of impact strength, as manifested in articles molded therefrom. Such additives can be admixed with the novel low UV cured non-crystalline terpolymer, the crystalline oxymethylene polymer or the blend of these two materials using conventional mixing techniques.

Suitable formaldehyde scavengers include cyanoguanidine, melamine and melamine derivatives, such as lower alkyl- and amine-substituted triazines, amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamides, longchain amides, waxes, oils, and polyether glycides. A preferred mold lubricant is commercially available from Glycol Chemical, Inc. under the designation Acrawax C, and is an alkylene bisstearamide. The preferred antioxidants are hindered bisphenols. Especially preferred is 1,6-hexamethylene bis-(3,5-di -t-butyl-hydroxyhydrocinnamate), commercially available from Ciba-Geigy Corp. under the designation Irganox 259.

A most preferred oxymethylene copolymer for use in the blends of this invention is commercially available from Hoechst-Celanese Corporation under the designation CELCON® M25-04 ac polymer. This oxymethylene copolymer has a melt index of about 2.5g/10 min. and contains 0.5 percent by weight Irganox 259, 0.1 percent by weight cyanoguanidine, and 0.2 percent by weight Acrawax C.

A most preferred oxymethylene terpolymer for use in the blends of this invention is commercially available from Hoechst-Celanese Corporation under the designation CELCON® U10-11 acetal polymer. This is the previously mentioned CELCON® U-10 acetal terpolymer stabilized by 0.5 percent by weight Irganox 259 and 0.1 percent by weight calcium ricinoleate.

The blends of the cured non-crystalline terpolymer and crystalline oxymethylene homo-, co- or terpolymer of this invention may be prepared by any conventional procedure that will result in a substantially uniform blend or admixture of the components. Preferably, dry or melt blending procedures and equipment are used. The cured non-crystalline terpolymer, which can range from a dry solid to a slightly tacky material, can be dry mixed with the crystalline oxymethylene polymer (in the form of pellets, chips, flakes, granules or powder), typically at room temperature (about 25° C.), and the resulting mixture melt blended in any conventional type extrusion equipment, which is customarily heated to a temperature of from about 170° C. to about 220° C., and preferably from about 190° C. to about 210° C. The sequence of addition of the components is not critical, and any conventional means may be used to form the substantially uniform admixture.

Preferably, the cured non-crystalline terpolymer and the crystalline oxymethylene polymer are dried (either individually or together) before being subjected to the blending procedure. Drying can be done in desiccated air having a dew point of about −30° C. to −40° C. or lower, at a temperature of from about 70° C. to about 110° C. The drying time will depend primarily on the moisture content, drying temperature, and particular equipment employed, but typically is from about 2 to about 6 hours or more. If the drying is conducted for longer periods of time, such as overnight, the drying temperature should preferably be about 70° C. to about 85° C. In general, any conventional drying procedure can be used to reduce the moisture content to below about 0.1 weight percent, based on the total weight of the cured non-crystalline terpolymer and the crystalline oxymethylene polymer, preferably below about 0.05 weight percent, and most preferably below about 0.01 weight percent.

If conventional mold lubricants, plasticizers, fillers (particularly glass in the form of filaments or strands, beads, dust or microbubbles, any of which forms can be sized or otherwise combined with coupling agents), nucleating agents, antioxidants, formaldehyde scavengers, chain scission inhibitors, ultraviolet light inhibitors and similar molding additives have not previously been added to the cured non-crystalline terpolymer or the crystalline oxymethylene polymer during the processing of these individual components of the blend, i.e., before they are admixed with each other, they may be added at this time.

The uniform admixture resulting from the blending procedure is then comminuted mechanically, for example by chopping, pelletizing or grinding, into granules, pellets, chips, flakes or powders, and processed in the thermoplastic state, for example by injection molding or extrusion molding into shaped articles, including bars, rods, plates, sheets, films, ribbons, tubes, and the like.

Preferably, the comminuted blend is dried again, in the manner discussed above, prior to being molded.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

EXAMPLE I

Thirty-five ml of freshly distilled 1,3-dioxolane are injected into a clean, dry 50 cc reactor tube which is continuously purged with dry nitrogen gas. Next, 5 ml of 4,7-dehydro-1,3-dioxepin are injected, and the reactor tube is transferred to an oil bath maintained at approximately 52° C. while maintaining the dry nitrogen purge. Fifteen ml of freshly distilled trioxane are then added, followed by $1 \times 10^{-3}$ mol/liter of a nitromethane solution of p-nitrobenzenediazonium-fluoroborate (previously prepared by adding 5 ml of nitromethane to 0.06 gram of p-nitrobenzendiazoniumfluoroborate). The monomer solution becomes viscous over an approximately 20 hour period.

Polymerization is allowed to continue for 20 hours. The reactor tube is then broken at liquid nitrogen temperature and the polymer mass removed and admixed with 100 ml of methylenechloride in a 500 ml beaker. This mixture is then allowed to shake for 24 hours on a shake table. The resulting viscous solution is added to 1000 ml of cold ethanol and stirred with a mechanical shaft stirrer at 400 rpm for 15 minutes.

The resulting two-phase mixture is placed in an ice bath and let stand for one hour, after which time a white, viscous polymer mass settles. The solvent is decanted and the polymer mass is then dried in a hood.

NMR analysis indicates that the polymer contains 24 mol percent trioxane, 72 mol percent 1,3-dioxolane and 4 mol percent 4,7-dehydro-1,3-dioxepin. The polymer has the following physical properties:

Melting Point: 18° C.

IV: 0.7.

EXAMPLE II 0.54 Gram of a trioxane/1,3-dioxolane/4,7-dehydro-1,3-dioxepin terpolymer prepared as described in Example I above and 0.05 gram of hexanediol diacrylate are dissolved in 3cc of nitromethane at room temperature. Next, 0.006 gram of benzoin isobutyl ether is added, and after removing the nitrobenzene solvent in a vacuum oven, the reaction mixture is subjected to ultraviolet light from a Radiation Polymer Company UV Processor for 5 minutes. A crosslinked polymer is obtained, as determined by its lack of solubility in methylene chloride.

EXAMPLES III and IV

The procedure of Example II is repeated in every detail except for the amounts of reactable materials and photoinitiator employed:

| Reactant | Example III | Example IV |
| --- | --- | --- |
| Terpolymer of Example I | 1.0 gram | 1.0 gram |
| 1,6-Hexanediol diacrylate | 0.1 gram | 0.1 gram |
| Benzoin isobutyl ether | 0.05 gram | 0.01 gram |

In each case, a crosslinked polymer is obtained, as determined by its lack of solubility in methylene chloride.

EXAMPLES V-VII

The procedure of Example II is again repeated in every detail except for the following. Trimethylolpropane triacrylate is used as the multifunctional crosslinking monomer, and the amounts of this monomer, the terpolymer and the photoinitiator employed are as follows:

| Reactant | Example V | Example VI | Example VII |
| --- | --- | --- | --- |
| Terpolymer of Example I | 1.0 gram | 1.0 gram | 1.0 gram |
| Trimethylolpropanetriacrylate | 0.1 gram | 0.1 gram | 0.5 gram |
| Benzoin isobutyl ether | 0.05 gram | 0.01 gram | 0.05 gram |

Once again, crosslinked polymers are obtained, as determined by their lack of solubility in methylene chloride.

EXAMPLE VIII

A partially crosslinked polymer is first prepared by reacting 1 gram of a trioxane/1,3-dioxolane/4,7-dehydro-1,3-dioxepin terpolymer prepared as described in Example I above with 0.05 gram of hexanediol diacrylate in the presence of 0.05 gram of benzoin iosbutyl ether in the manner described in Example II above.

Blends of this partially crosslinked material with 5, 10, 5, 20, 25 and 30%, based on the total weight of the blend, of CELCON ® acetal copolymer (Hoechst-Celanese Corporation) are then prepared by mixing the respective materials, in granular form (after drying overnight at 75° C.), at room temperature and then blending the resulting uniform mixtures in an extruder at 190°–210° C.

Improved impact strength molding resins are obtained.

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by the following claims.

We claim:

1. An ultraviolet curable non-crystalline terpolymer of trioxane, from at least 65 weight percent to about 75 weight percent of 1,3-dioxolane and from about 2 weight percent to about 20 weight percent of a monoethylenically unsaturated aliphatic diol formal having at least 4 carbon atoms in its main chain, said weight percentages being based on the total weight of said monomers.

2. A terpolymer as recited in claim 1 having an intrinsic viscosity of from about 0.5 to about 1.5.

3. A terpolymer as recited in claim 2 containing about 70 weight percent of 1,3-dioxolane and from about 5 weight percent to about 10 weight percent of the monoethylenically unsaturated aliphatic diol formal.

4. A terpolymer as recited in claim 3 wherein the monoethylenically unsaturated aliphatic diol formal has from 4 to 8 carbon atoms in its main chain.

5. A terpolymer as recited in claim 4 wherein the monoethylenically unsaturated aliphatic diol formal is 4,7-dehydro-1,3-dioxepin.

6. A terpolymer as recited in claim 4 wherein the monoethylenically unsaturated aliphatic diol formal is 2-n-hexene-1,4-diol formal.

7. An ultraviolet curable blend of (a) a non-crystalline terpolymer of trioxane, from at least 65 weight percent to about 75 weight percent of 1,3-dioxolane and from about 2 weight percent to about 20 weight percent of a monoethylenically unsaturated aliphatic diol formal having at least 4 carbon atoms in its main chain, said weight percentages being based on the total weight of said monomers, and (b) a multifunctional crosslinking monomer, said terpolymer being present in an amount of from about 1 weight percent to about 20 weight percent, based on the total weight of said terpolymer and said crosslinking monomer.

8. An ultraviolet curable blend as recited in claim 7 wherein said terpolymer has an intrinsic viscosity of from about 0.8 to about 1.0.

9. An ultraviolet curable blend as recited in claim 8 wherein said terpolymer contains about 70 weight percent of 1,3-dioxolane and from about 5 weight percent to about 10 weight percent of the monoethylenically unsaturated aliphatic diol formal.

10. A ultraviolet curable blend as recited in claim 9 wherein the monoethylenically unsaturated aliphatic diol formal has from 4 to 8 carbon atoms in its main chain.

11. A ultraviolet curable blend as recited in claim 10 wherein the monoethylenically unsaturated aliphatic diol formal is 4,7-dehydro-1,3-dioxepin.

12. An ultraviolet curable blend as recited in any one of claims 7–11, inclusive, wherein the multifunctional crosslinking monomer is a multifunctional acrylate.

13. An ultraviolet curable blend as recited in claim 12 wherein the multifunctional acrylate is 1,6-hexanediol diacrylate.

14. An ultraviolet curable blend as recited in claim 12 wherein the multifunctional acrylate is trimethylolpropane triacrylate.

15. An ultraviolet curable blend as recited in claim 7 which also contains a photosensitizer.

16. An ultraviolet curable blend as recited in claim 15 wherein the photosensitizer is a benzoin compound.

17. An ultraviolet curable blend as recited in claim 16 wherein said benzoin compound is benzoin isobutyl ether.

18. A cured resinous composition prepared by ultraviolet curing a blend as recited in any one of claims 15–17, inclusive.

19. A blend of:
(A) an ultraviolet cured blend of (a) a non-crystalline terpolymer of trioxane, from at least 65 weight percent to about 75 weight percent of 1,3-dioxolane and from about 2 weight percent to about 20 weight percent of a monoethylenically unsaturated aliphatic diol formal having at least 4 carbon atoms in its main chain, said weight percentages being based on the total weight of said monomers, and (b) a multifunctional crosslinking monomer, said terpolymer being present in an amount of from about 1 weight percent to about 20 weight percent, based on the total weight of said terpolymer and said crosslinking monomer, and
(B) a crystalline oxymethylene polymer.

20. A blend as recited in claim 19 wherein said terpolymer, in the uncured state, has an intrinsic viscosity of from about 0.5 to about 1.5.

21. A blend as recited in claim 20 wherein said terpolymer contains about 70 weight percent of 1,3-dioxolane and from about 5 weight percent to about 10 weight percent of the monoethylenically unsaturated aliphatic diol formal.

22. A blend as recited in claim 21 wherein the monoethylenically unsaturated aliphatic diol formal has from 4 to 8 carbon atoms in its main chain.

23. A blend as recited in claim 22 wherein the monoethylenically unsaturated aliphatic diol formal is 4,7-dehydro-1,3-dioxepin.

24. A blend as recited in claim 19 wherein the multifunctional crosslinking monomer is a multifunctional acrylate.

25. A blend as recited in claim 24 wherein the multifunctional acrylate is 1,6-hexanediol diacrylate.

26. A blend as recited in claim 24 wherein the multifunctional acrylate is trimethylolpropane triacrylate.

27. A blend as recited in any one of claims 19–26, inclusive, wherein said crystalline oxymethylene polymer is one in which oxymethylene groups comprise at least about 85 percent of the crystalline polymer's recurring units.

28. A blend as recited in claim 27 wherein said crystalline oxymethylene polymer is an end-capped oxymethylene homopolymer.

29. A blend as recited in claim 27 wherein said crystalline oxymethylene polymer is an oxymethylene copolymer having oxymethylene groups interspersed with oxy(higher) alkylene groups represented by the general formula:

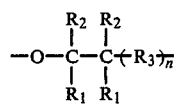

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive.

30. A blend as recited in claim 29 wherein said crystalline oxymethylene polymer is an oxymethylene copolymer consisting essentially of oxymethylene groups interspersed with oxy(higher)alkylene groups represented by said general formula.

31. A blend as recited in claim 30 wherein said crystalline oxymethylene polymer is a copolymer of trioxane and ethylene oxide.

32. A blend as recited in claim 30 wherein said crystalline oxymethylene polymer is a copolymer of trioxane and 1,3-dioxolane.

33. A blend as recited in claim 27 wherein said crystalline oxymethylene polymer is an oxymethylene terpolymer.

34. A blend as recited in claim 33 wherein said terpolymer is one having oxymethylene groups, oxy(higher) alkylene groups represented by the general formula:

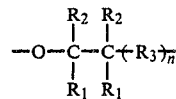

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive, and a different, third group interpolymerizable with oxymethylene and oxy (higher) alkylene groups.

35. A blend as recited in claim 34 wherein said different, third group is a bifunctional group.

36. A blend as recited in claim 35 wherein said bifunctional group is derived from a diglycide of the general formula:

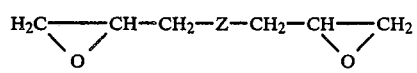

wherein Z represents a carbon-to-carbon bond, an oxygen atom, and oxyalkoxy group of 1 to 8 carbon atoms, inclusive, an oxycycloalkoxy group of 4 to 8 carbon atoms, inclusive, or an oxypoly(lower alkoxy) group having 2 to 4 recurring lower alkoxy groups each with 1 or 2 carbon atoms.

37. A blend as recited in claim 33 wherein said crystalline oxymethylene polymer is a terpolymer of trioxane, ethylene oxide and butanediol diglycidyl ether.

* * * * *

UNITED STATES PATENT AND TRADEMARK OFFICE
CERTIFICATE OF CORRECTION

PATENT NO. : 4,758,608

DATED : July 19, 1988

INVENTOR(S) : George L. Collins, Paul Zema and William M. Pleban

It is certified that error appears in the above-identified patent and that said Letters Patent is hereby corrected as shown below:

Abstract, line 6, column 3, line 14, column 4, lines 57 and 58, column 11, lines 42 and 65, column 12, lines 4 and 5, 56 and 57, column 13, lines 31 and 63, and column 14, lines 45 and 46, "4,7-dehydro-1,3-dioxepin", each occurrence, should read --4,7-dihydro-1,3-dioxepin--. Column 5, lines 2 and 3, delete "the terpolymer admixed with multifunctional crosslinking monomer" and replace with --a multifunctional crosslinking monomer admixed with the terpolymer--. Column 12, line 59, delete "iosbutyl" and replace with --isobutyl--. Column 12, lines 61-63, delete "Blends of this partially crosslinked material with 5, 10, 5, 20, 25 and 30%, based on the total weight of the blend, of CELCON" and replace with --Blends containing 5, 10, 15, 20, 25 and 30%, based on the total weight of the blend, of this partially crosslinked material with CELCON--. Claim 7, column 13, line 43 and claim 19, column 14, lines 25 and 26, delete "said terpolymer", each occurrence, and replace with --said crosslinking monomer--.

Signed and Sealed this

Twenty-fourth Day of January, 1989

*Attest:*

DONALD J. QUIGG

*Attesting Officer*  *Commissioner of Patents and Trademarks*